US012654043B2

(12) United States Patent
Leonardson et al.

(10) Patent No.: US 12,654,043 B2
(45) Date of Patent: Jun. 16, 2026

(54) HARNESS SPACER, HARNESS INCLUDING THE SAME, AND METHOD OF ATTACHING A HARNESS SPACER

(71) Applicant: WERNER CO., Greenville, PA (US)

(72) Inventors: Tracee Leonardson, Ashtabula, OH (US); Cody Rappoport, Greenville, PA (US); Justin Patton, Franklin, PA (US)

(73) Assignee: WERNER CO., Itasca, IL (US)

( * ) Notice: Subject to any disclaimer, the term of this patent is extended or adjusted under 35 U.S.C. 154(b) by 1027 days.

(21) Appl. No.: 17/168,832

(22) Filed: Feb. 5, 2021

(65) Prior Publication Data

US 2022/0249887 A1 Aug. 11, 2022

(51) Int. Cl.
*A62B 35/00* (2006.01)

(52) U.S. Cl.
CPC ...... *A62B 35/0025* (2013.01); *A62B 35/0018* (2013.01)

(58) Field of Classification Search
CPC ............ A62B 35/0025; A62B 35/0018; A62B 35/0037; A62B 35/0031; A62B 1/04; A44B 11/006; Y10T 24/1394; Y10T 24/4047
See application file for complete search history.

(56) References Cited

U.S. PATENT DOCUMENTS 2,780,125 A * 2/1957 Milyard ................. B23Q 37/00 82/149
D209,013 S * 10/1967 McElroy ........................ D8/394
6,038,747 A * 3/2000 Hamilton ................ A45F 3/047 24/632
6,527,082 B1 * 3/2003 Taylor ................ A62B 35/0031 182/5
6,684,463 B1 * 2/2004 Yang .................... A44B 11/001 24/200
7,073,627 B2 * 7/2006 Casebolt ............ A62B 35/0031 119/770
8,001,904 B2 * 8/2011 Maes ................. A62B 35/0056 104/115
8,177,025 B2 * 5/2012 Lang .................. A62B 35/0037 182/4

(Continued)

FOREIGN PATENT DOCUMENTS

DE 102012014693 A1 * 1/2014 ......... A62B 35/0025
DE 102013019343 A1 * 5/2015 ......... A62B 35/0037

(Continued)

OTHER PUBLICATIONS

German Patent Office "First Examination Report" for corresponding DE patent application No. 102022102149.1, dated Dec. 5, 2023 (with English machine translation), 12 pp.

(Continued)

*Primary Examiner* — Brian D Mattei
*Assistant Examiner* — Kathleen M. McFarland
(74) *Attorney, Agent, or Firm* — Michael Best & Friedrich LLP

(57) ABSTRACT

A harness spacer includes a base having a first outer slot, a second outer slot, and a central slot, wherein the first outer slot, the second outer slot, and the central slot form an H-shape, a first arched member extending from the base and creating a first opening, and a second arched member extending from the base and creating a second opening, wherein the base is composed of a pliable material.

17 Claims, 9 Drawing Sheets

(56) References Cited

U.S. PATENT DOCUMENTS 8,794,378 B2 * 8/2014 Wolner .............. A62B 35/0031 242/378.1
8,938,864 B2 * 1/2015 Casebolt ............ A62B 35/0037 294/82.23
9,033,103 B2 * 5/2015 Renton .............. A62B 35/0087 182/36
9,084,906 B2 * 7/2015 Schurian ............ A62B 35/0037
9,273,717 B2 * 3/2016 Schlangen ............ F16B 45/027
9,320,924 B2 * 4/2016 Patel .................. A62B 35/0037
9,427,608 B2 * 8/2016 Fink ................... A62B 35/0075
9,585,439 B2 * 3/2017 Casebolt ............ A62B 35/0037
10,502,607 B2 * 12/2019 Halliburton ............... F16B 2/22
11,191,325 B2 * 12/2021 Hetrich .................. A44B 11/28
11,369,816 B2 * 6/2022 Carrasca ............ A62B 35/0037
11,497,948 B2 * 11/2022 Monahan ........... A62B 35/0025
11,806,559 B2 * 11/2023 Auston .............. A62B 35/0031
11,813,487 B2 * 11/2023 Stephenson ........ A62B 35/0037
2005/0067222 A1 * 3/2005 Casebolt ............ A62B 35/0037 182/30
2008/0060873 A1 * 3/2008 Lang .................. A62B 35/0018 182/18
2010/0293759 A1 * 11/2010 Wada ................. A62B 35/0031 267/136
2010/0300804 A1 * 12/2010 Willingham ....... A62B 35/0018 182/3
2012/0228056 A1 * 9/2012 Lang .................. A62B 35/0031 182/3
2013/0008742 A1 * 1/2013 Schurian ............ A62B 35/0031 182/3
2013/0104351 A1 * 5/2013 Casebolt ................. F16B 45/04 24/522
2013/0104374 A1 * 5/2013 Schlangen ............ F16B 45/022 24/600.2
2014/0262608 A1 * 9/2014 Patel ..................... F16B 45/035 24/592.11
2014/0331459 A1 * 11/2014 Fink ................... A62B 35/0037 24/302
2015/0033458 A1 * 2/2015 Theisen ............. A62B 35/0025 2/467
2015/0107059 A1 * 4/2015 Casebolt ................ A44B 11/04 24/527
2016/0361577 A1 * 12/2016 Perner ................ A62B 35/0031
2017/0120087 A1 * 5/2017 Cowell .............. A62B 35/0006
2019/0001165 A1 * 1/2019 Schurian ............ A44B 13/0029
2019/0313746 A1 * 10/2019 Hetrich .............. A62B 35/0025
2019/0329077 A1 * 10/2019 Carrasca ............ A62B 35/0037
2020/0107615 A1 * 4/2020 Auston .............. A62B 35/0037
2020/0114180 A1 * 4/2020 Monahan ........... A62B 35/0025
2020/0129790 A1 * 4/2020 Stephenson ........ A62B 35/0025
2020/0155879 A1 * 5/2020 Chang ................ A62B 35/0037
2020/0206549 A1 * 7/2020 Shaver ............... A62B 35/0025
2020/0230445 A1 * 7/2020 Auston .............. A62B 35/0037
2020/0376308 A1 * 12/2020 Dancyger ............... F16G 11/00
2022/0134150 A1 * 5/2022 Auston .............. A62B 35/0037 182/3
2022/0249887 A1 * 8/2022 Leonardson ....... A62B 35/0018
2022/0355134 A1 * 11/2022 McLeod ............ A62B 35/0018

FOREIGN PATENT DOCUMENTS

EP 2780125 A2 9/2014
EP 2781235 A2 * 9/2014 ......... A62B 35/0012
EP 4122551 A1 * 1/2023 ......... A62B 35/0018

OTHER PUBLICATIONS

Mexican Patent Office Action for Application No. MX/a/2022/001323 dated Jul. 11, 2025 (12 pages including English translation).
Mexican Patent Office Action for Application No. MX/a/2022/001323 dated Nov. 19, 2025 (19 pages including English translation).

* cited by examiner

HARNESS SPACER, HARNESS INCLUDING THE SAME, AND METHOD OF ATTACHING A HARNESS SPACER

BACKGROUND

Field

The disclosed concept relates generally to accessories for harnesses in fall protection systems, and in particular, to a harness spacer for use with a harness in fall protection systems.

Background Information

In fall protection systems, a worker typically wears a harness. In some systems, a lifeline is attached to an attachment point on the harness and to an anchor point on a building, connecting the worker to the anchor point. In the case of a fall, the lifeline will arrest the fall, preventing injury to the worker. There are numerous types of lifelines, harnesses, and types of anchor points used, but the principle of arresting the fall is generally similar.

In an example type of harness, a D-ring in a dorsal location is employed as the attachment point where the harness is attached to the lifeline. The D-ring includes a slot through which webbing of the harness passes and a generally circular aperture to which the lifeline can be connected. Typically, a slotted mounting plaque is employed in the vicinity of the D-ring. The webbing passes through slots in the mounting plaque and the D-ring so that when the webbing is pulled tight, the slotted end of the D-ring is pulled tight against the mounting pieces.

One type of accessory for a harness is a dual self-retracting lifeline (SRL) bracket. The dual-SRL bracket attaches to the webbing of the harness in the vicinity of the D-ring and mounting plaque and facilitates connection of the harness to two SRLs. In the example harness, adding the dual-SRL bracket first requires adjusting the webbing of the harness to loosen the webbing in the area of the D-ring and the mounting piece to create a space for the dual-SRL bracket to attach to the webbing. The webbing is then tightened again to secure the dual-SRL bracket in place. When the dual-SRL bracket is removed, the webbing of the harness should then be adjusted again to pull the D-ring against the mounting plaque and remove the gap where the dual-SRL bracket was attached.

The adjustment of the harness to attach the dual-SRL bracket and then the subsequent readjustment of the harness when the dual-SRL bracket has been removed can become time consuming. There remains room for a device which allows a dual-SRL bracket to be easily attached and removed from a harness.

SUMMARY

These needs and others are met by embodiments of the disclosed concept in which a harness spacer for a harness includes slotted and arched members which accommodate connection to webbing of the harness and another accessory, respectively.

In accordance with one aspect of the disclosed concept, a harness spacer comprises: a base having a first outer slot, a second outer slot, and a central slot, wherein the first outer slot, the second outer slot, and the central slot form an H-shape; a first arched member extending from the base and creating a first opening; and a second arched member extending from the base and creating a second opening, wherein the base is composed of a pliable material.

In accordance with another aspect of the disclosed concept, a harness comprises: a webbing; and a harness spacer attached to the webbing, the harness spacer including: a base having a first outer slot, a second outer slot, and a central slot, wherein the first outer slot, the second outer slot, and the central slot form an H-shape; a first arched member extending from the base and creating a first opening; and a second arched member extending from the base and creating a second opening, wherein the base is composed of a pliable material, and wherein the webbing passes through the first outer slot and the second outer slot.

In accordance with another aspect of the disclosed concept, a method of attaching a harness spacer to a harness comprises: providing a harness spacer having a base having a first outer slot, a second outer slot, and a central slot, wherein the first outer slot, the second outer slot, and the central slot form an H-shape, a first arched member extending from the base and creating a first opening, and a second arched member extending from the base and creating a second opening, wherein the base is composed of a pliable material; bending the base of the harness spacer by pressing the first and second arched members away from each other; pushing webbing of the harness through the central slot while the base of the harness spacer is bent; positioning the webbing such that the webbing passes through the first and second outer slots of the harness spacers; and releasing pressure on the first and second arched members of the harness spacer.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
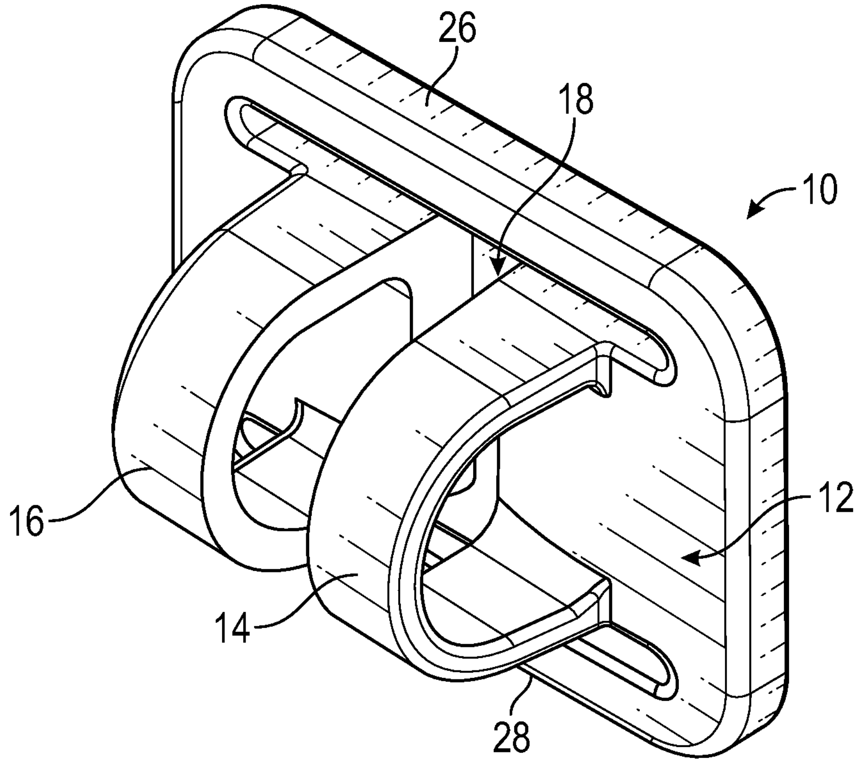
FIG. 1 is an isometric view of a harness spacer in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
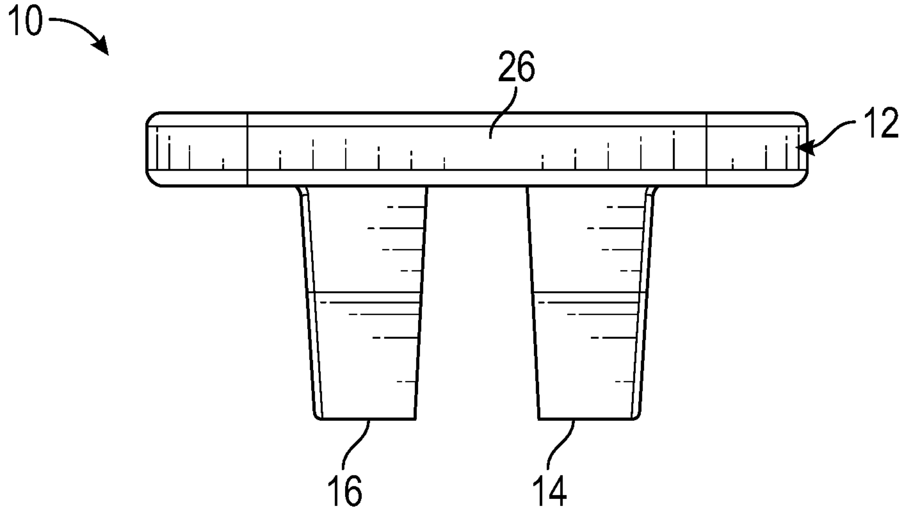
FIG. 2 is a front view of the harness spacer of FIG. 1.
Figure 3:
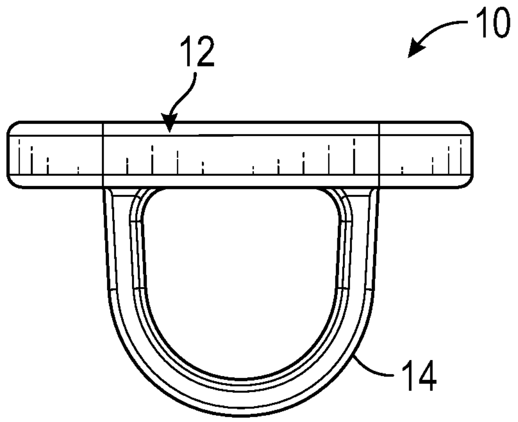
FIG. 3 is a side view of the harness spacer of FIG. 1.
Figure 4:
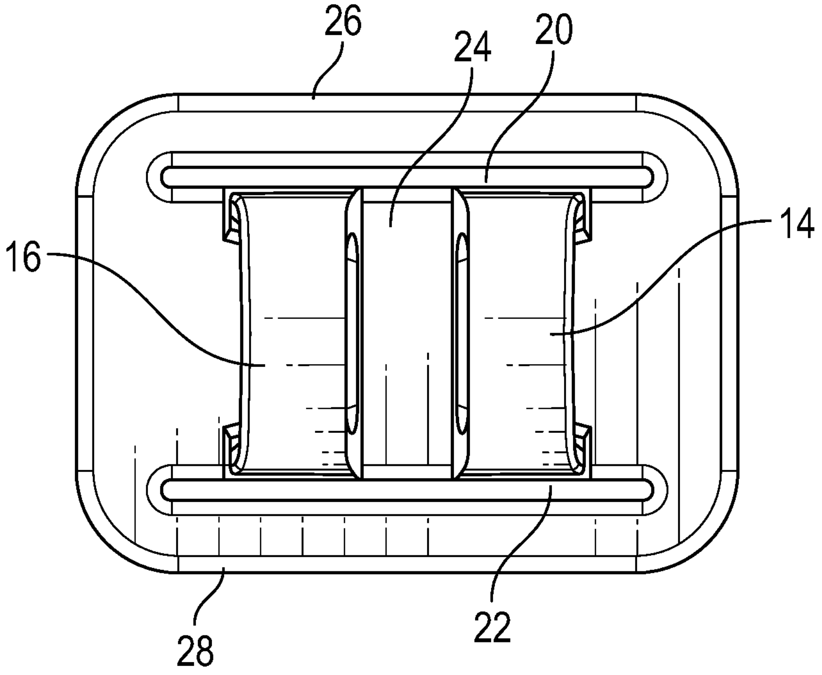
FIG. 4 is a top view of the harness spacer of FIG. 1.
Figure 5:
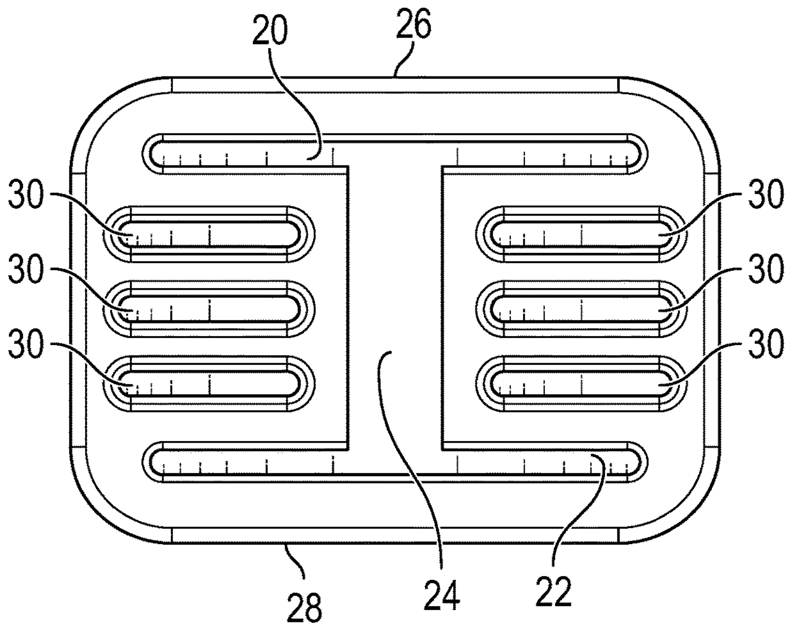
FIG. 5 is a bottom view of the harness spacer of FIG. 1.

FIG. 1 is an isometric view of a harness spacer 10 in accordance with an example embodiment of the disclosed concept. FIG. 2 is a front view of the harness spacer 10 of FIG. 1, FIG. 3 is a side view of the harness spacer 10 of FIG. 1, FIG. 4 is a top view of the harness spacer 10 of FIG. 1, and FIG. 5 is a bottom view of the harness spacer 10 of FIG. 1.

The harness spacer 10 includes a base 12, a first arched member 14, a second arched member 16, and a slotted opening 18. The base 12 is a substantially planar member and the slotted opening 18 is formed in the base 12. In some example embodiments of the disclosed concept, the base 12 has a substantially rectangular shaped outer periphery. However, it will be appreciated that the outer periphery of the base 12 may have other shapes without departing from the scope of the disclosed concept. In some example embodiments, the slotted opening 18 has an H-shape. For example, the slotted opening 18 may be composed of a first outer slot 20, a second outer slot 22, and a central slot 24. The first outer slot 20 may be an elongated opening formed proximate a first edge 26 of the base 12 and extending the majority of the length of the first edge 26. The second outer slot 22 may be an elongated opening formed proximate a second edge 28, opposite of the first edge 26, of the base 12 and extending the majority of the length of the second edge 28. The central slot 24 may be an elongated opening that extends from and joins central portions of the first outer slot 20 and the second outer slot 22. Together, the first outer slot 20, the second outer slot 22, and the central slot 24 form the H-shaped slotted opening 18 in the example embodiment of the harness spacer 10 shown in FIGS. 1-5.

The first arched member 14 and the arched member 16 each include two legs that extend upward from the base 12 that blend into an arch that connects the two legs. In some example embodiments, the legs may extend upward substantially perpendicular to the base 12. However, it will be appreciated that the legs may extend upward at other angles with respect to the base 12 without departing from the scope of the disclosed concept. The legs of the first arched member 14 may be joined to the base 12 in an area between the first outer slot 20 and the second outer slot 22 on a first side of the central slot 24. The legs of the second arched member 16 may be joined to the base 12 between the first outer slot 20 and the second outer slot 22 on a second side, opposite of the first side, of the central slot 24. The first and second arched members 14, 16 each form an opening whose bounds are defined by the base 12, the legs, and the arch. The openings are aligned such that lines passing in an axial direction through the opening formed by the first arched member 14 also pass through the opening formed by the second arched member 16. For example, an elongated member can pass through both openings.

In some example embodiments, on the bottom side of the base 12 (shown in FIG. 5) are grooves 30. The grooves 30 may be formed in areas between the first and second outer slots 20, 22. In the example embodiment, there are three grooves 30 formed between the first and second outer slots 20, 22 on one side of the central slot 24 and three grooves 30 formed between the first and second outer slots 20, 22 on the other side of the central slot 24. However, it will be appreciated that the number of grooves 30 and their specific locations may be varied without departing from the scope of the disclosed concept. The grooves 30 facilitate a more uniform thickness of material in the harness spacer 10, making it easier to manufacture.

The base 12 may be formed of a pliable material such that it is bendable. In some example embodiments, the base 12 may be composed of a thermoplastic material such as, without limitation, thermoplastic polyurethane (TPU). In some example embodiments, the base 12 is composed of a material having a hardness of approximately Shore A 91. In some example embodiments, the base 12 is composed of a material having a hardness within a range of approximately Shore A 70-100. However, it will be appreciated that other hardness values may be employed without departing from the scope of the disclosed concept. In some example embodiments, the harness spacer 10 is a unitary piece composed of the same material. Manufacturing the harness spacer 10 as a unitary piece is cost effective and provides structural strength. However, it will be appreciated that the harness spacer 10 may be a multi-piece object without departing from the scope of the disclosed concept. For example, the base 12 and the first and second arched members 14, 16 may be separate pieces that are joined together without departing from the scope of the disclosed concept. In this case, the separate pieces may be composed of different materials. For example, the base 12 and the first and second arched members 14, 16 may be composed of different materials or the same material without departing from the scope of the disclosed concept.

The dimensions of the harness spacer 10 may be selected based on the harness and harness accessory that the harness spacer 10 is used with. For example, the length of the first and second outer slots 20, 22 may be slightly greater than the width of the webbing of the harness that the harness spacer 10 will be used with. As another example, the openings created by the first and second arched members 14, 16 should be large enough to receive the harness accessory, such as a dual-SRL bracket, the harness spacer 10 will be used with.

As noted above, in some example embodiments, the harness spacer 10 is composed of a thermoplastic material. The harness spacer 10 may also be composed of other flexible materials. In use, the harness spacer 10 is flexible such that the first and second arched members 14, 16 can be pulled apart from each other such that the base 12 of the harness spacer 10 bends. Bending the harness spacer 10 in this manner enlarges the size of the central slot 24 such that webbing of a harness can be pushed through the central slot 24. The webbing may then be positioned such that it passes through one of the first and second outer slots 20, 22 and then back through the other of the first and second outer slots 20, 22. When the harness spacer 10 is released, it will revert back to its original shape and will be attached to the webbing. Reversing the process by pulling apart the first and second arched members 14, 16 to bend the harness spacer 10 allows the harness spacer 10 to then be detached from the webbing.

Figure 6:
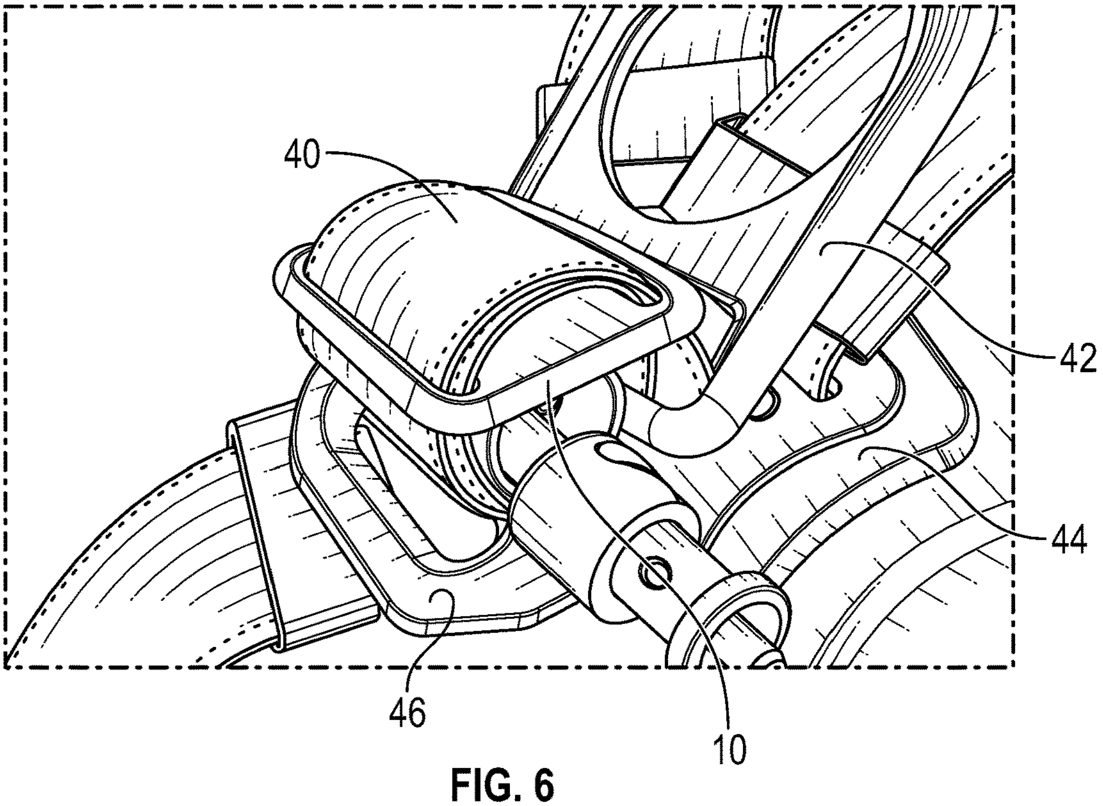
FIG. 6 is a view of a harness spacer installed at a dorsal D-ring location on a harness in accordance with an exemplary embodiment of the disclosed concept.

FIG. 6 is a view of the harness spacer 10 installed at a dorsal D-ring location on a harness in accordance with an exemplary embodiment of the disclosed concept. Shown in FIG. 6 is webbing 40 of a harness in the vicinity of a dorsal D-ring 42. Also shown in FIG. 6 is a mounting plaque 44. In a typical harness, the webbing 40 would be pulled tight against the mounting plaque 44. However, in the example embodiment shown in FIG. 6, the harness spacer 10 is attached to the webbing 40. The harness spacer 10 is oriented such that the first and second arched members 14, 16 (numbered in FIG. 1 for example) are pressed against the mounting plaque 44 and the base 12 is spaced apart from the mounting plaque 44. The loop of webbing 40 that would normally pull the D-ring 42 against the mounting plaque 44 now passes through the first and second outer slots 20, 22 of the harness spacer 10, pulling the harness spacer 10 tight against the mounting plaque 44. The harness spacer 10 creates a space between the webbing 40 and the mounting plaque 44, namely, the openings of the first and second arched members 14, 16 form an opening through which an accessory, such as a dual-SRL bracket 46, can be attached. As shown in FIG. 6, the dual-SRL bracket 46 is a releasable bracket that has a movable member to release the bracket. The movable member is passed through the openings of the first and second arched members 14, 16 and then is locked into place to attach the dual-SRL bracket 46 to the harness spacer 10. The moveable member can then be unlocked and slid out of the openings to release the dual-SRL bracket 46.

When the dual-SRL bracket 46 is detached, the harness spacer 10 can remain in place and the webbing 40 does not need to be readjusted. The dual-SRL bracket 46 can then be attached and detached as desired without the need for adjustment of the webbing 40.

In addition to creating space for attachment of the dual-SRL bracket 46, the harness spacer 10 also tends to the lock the webbing 40 in place and prevent it from moving downward under pressure. For example, the harness spacer 10 changes angles and adds additional friction points of the webbing 40 which tend to better lock it in place. The harness spacer 10 also tends to hold the D-ring 42 in an upward position, for example, by blocking the D-ring 42 from rotating downward. In the example embodiment shown in FIG. 6, the base of the harness spacer 10 is spaced apart from the mounting plaque 44. However, it will be appreciated that in some embodiments, the orientation of the harness spacer 10 is reversed such that the base of the harness spacer 10 is closer to the harness, as is shown for example in FIGS. 8-12.

Figure 7:
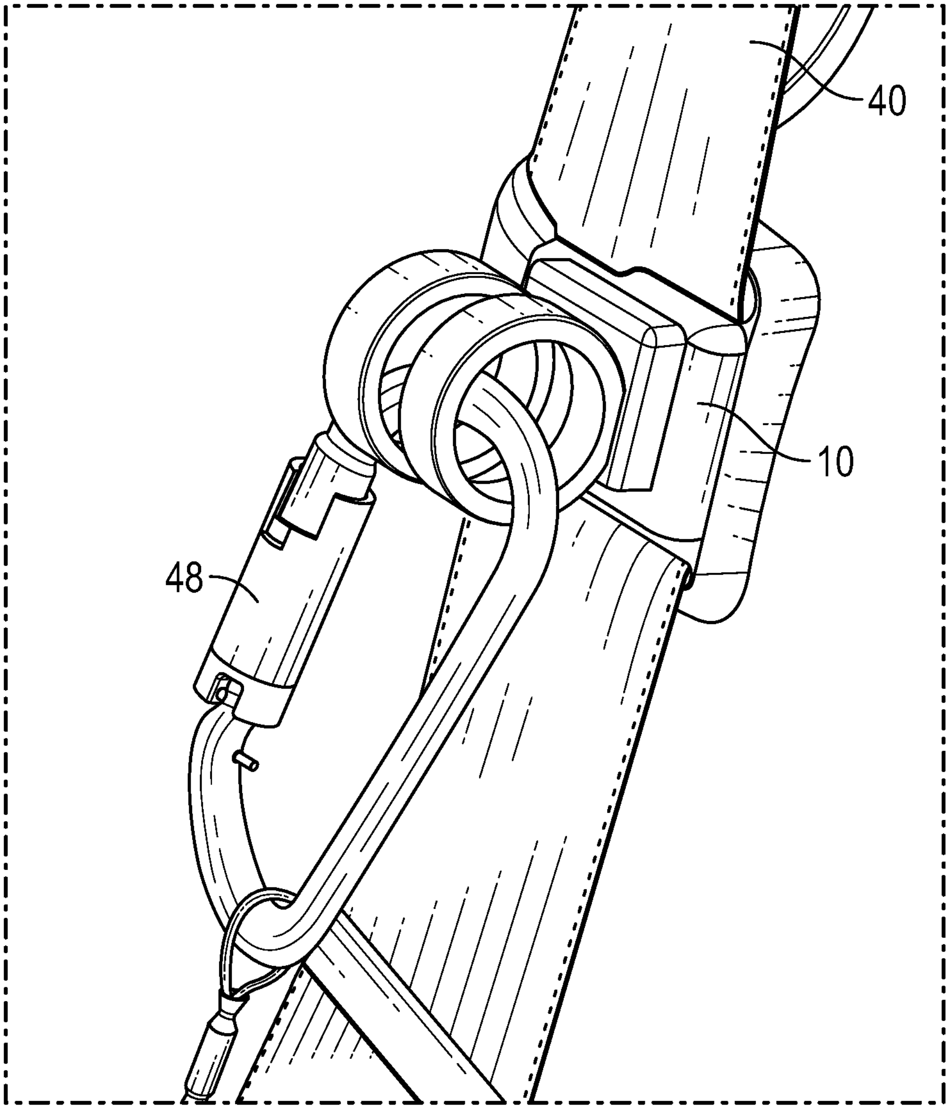
FIG. 7 is a view of a harness spacer attached to webbing of a harness in accordance with an exemplary embodiment of the disclosed concept.

As shown in FIG. 6, the harness spacer 10 can be used to create a space for attachment and detachment of the dual-SRL bracket 46 at the dorsal D-ring 42 location. However, the harness spacer 10 can easily be attached and detached from the webbing 40 of the harness at various other locations. For example, the harness spacer 10 can be attached to other areas of the webbing 40 and used as a general accessory attachment point. For example, FIG. 7 is a view of the harness spacer 10 attached to webbing 40 of a harness as an accessory attachment point in accordance with an exemplary embodiment of the disclosed concept. As shown in FIG. 7, the harness spacer 10 is attached to the webbing 40 with the first and second arched members 14, 16 facing outward. A carabiner 48 is attached to the harness spacer 10 by passing the carabiner 48 through the openings of the first and second arched members 14, 16. Various items, such as tools, may then be attached to the carabiner 48. In this manner, the tools are tethered to the harness via the harness spacer 10 and are prevented from being dropped, which would create a safety hazard to anyone below the worker.

Figure 8:
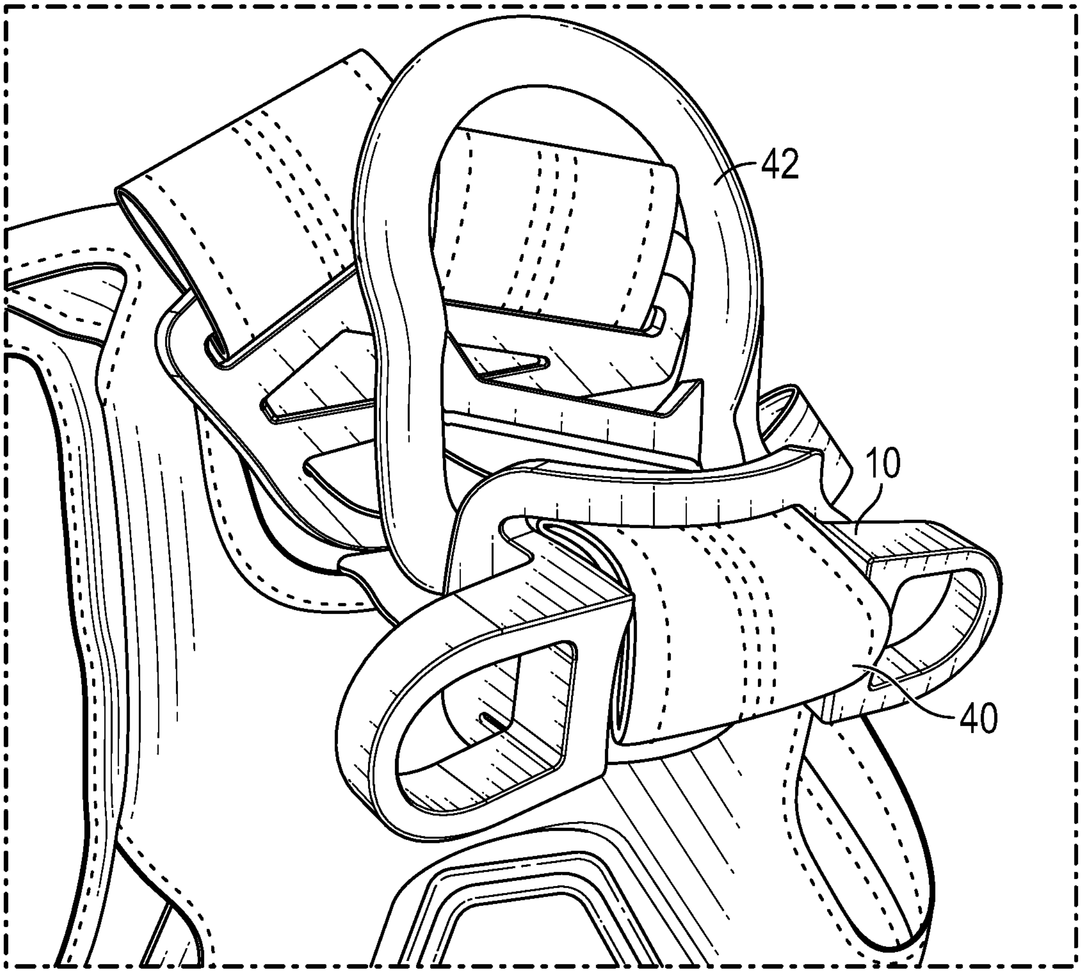
FIGS. 8-12 are views of a process of installing a harness spacer at a dorsal D-ring location on a harness in accordance with an exemplary embodiment of the disclosed concept.
Figure 9:
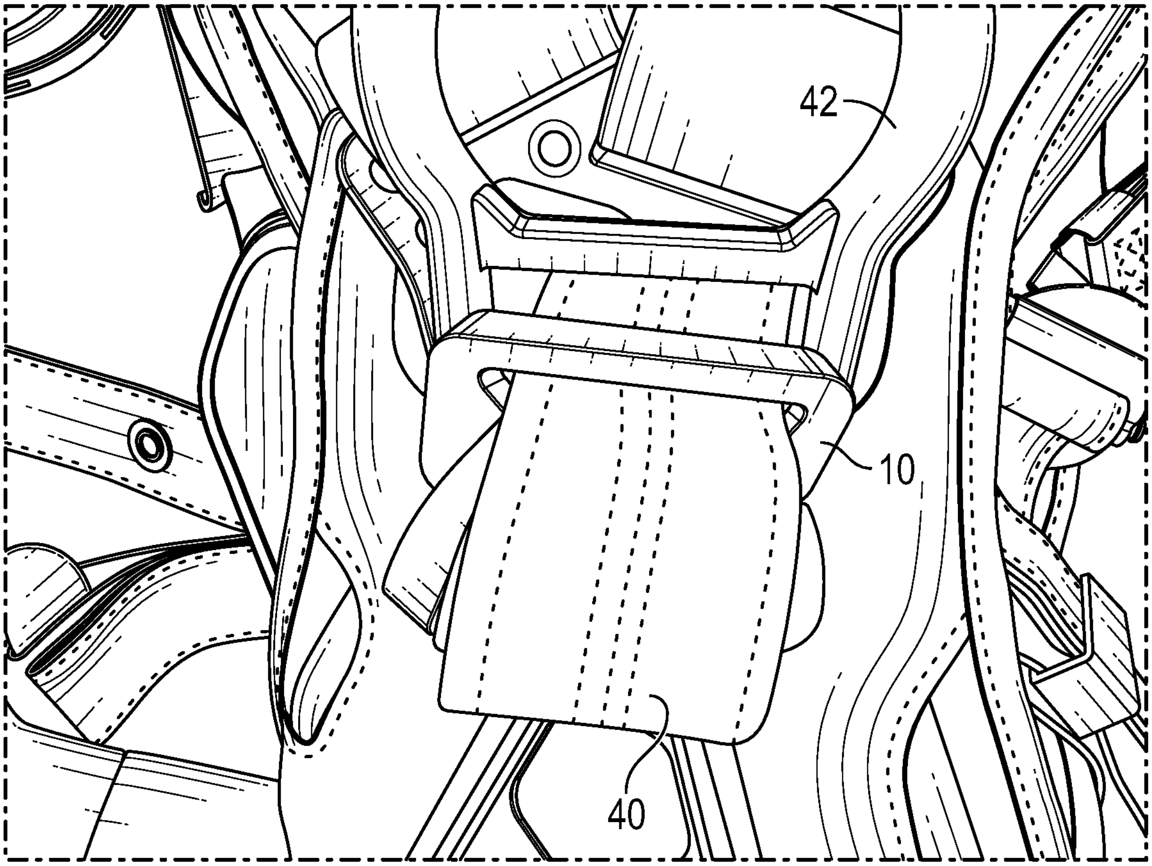
Figure 10:
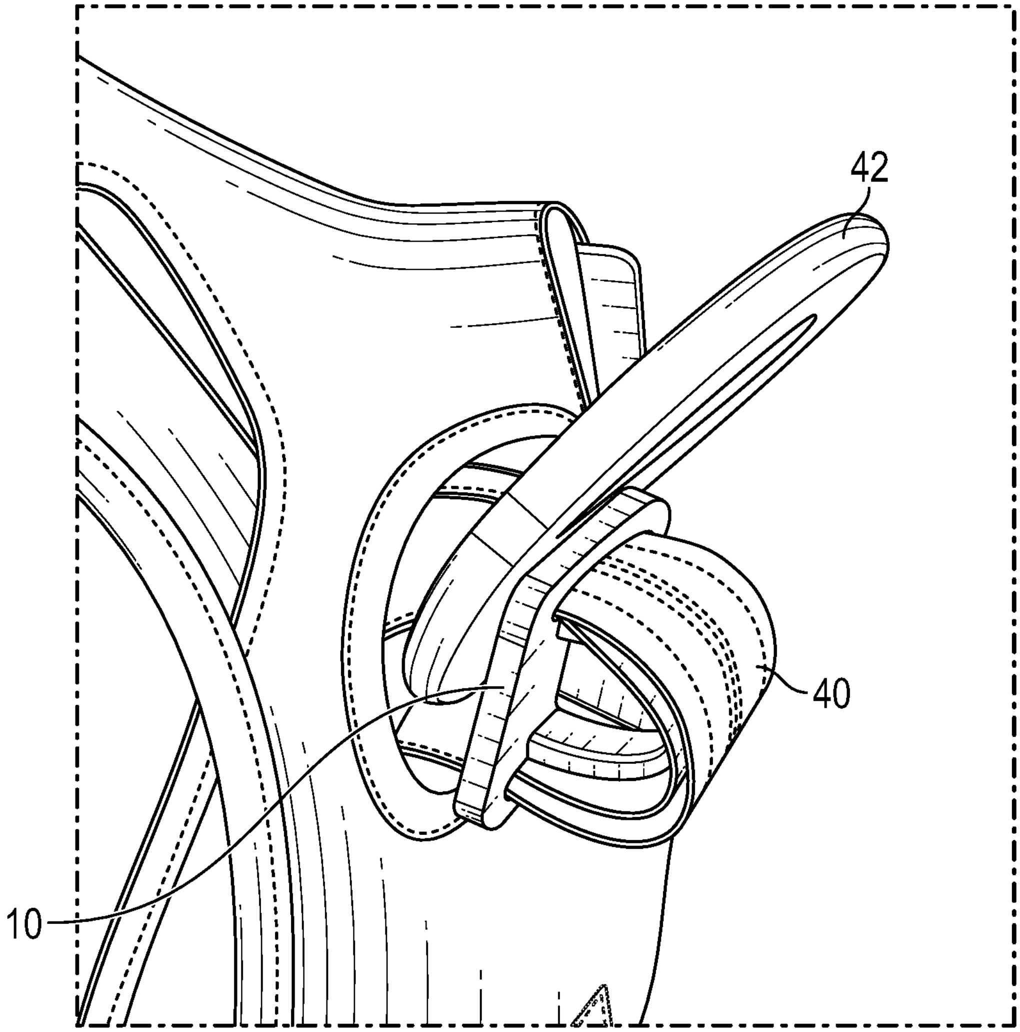
Figure 11:
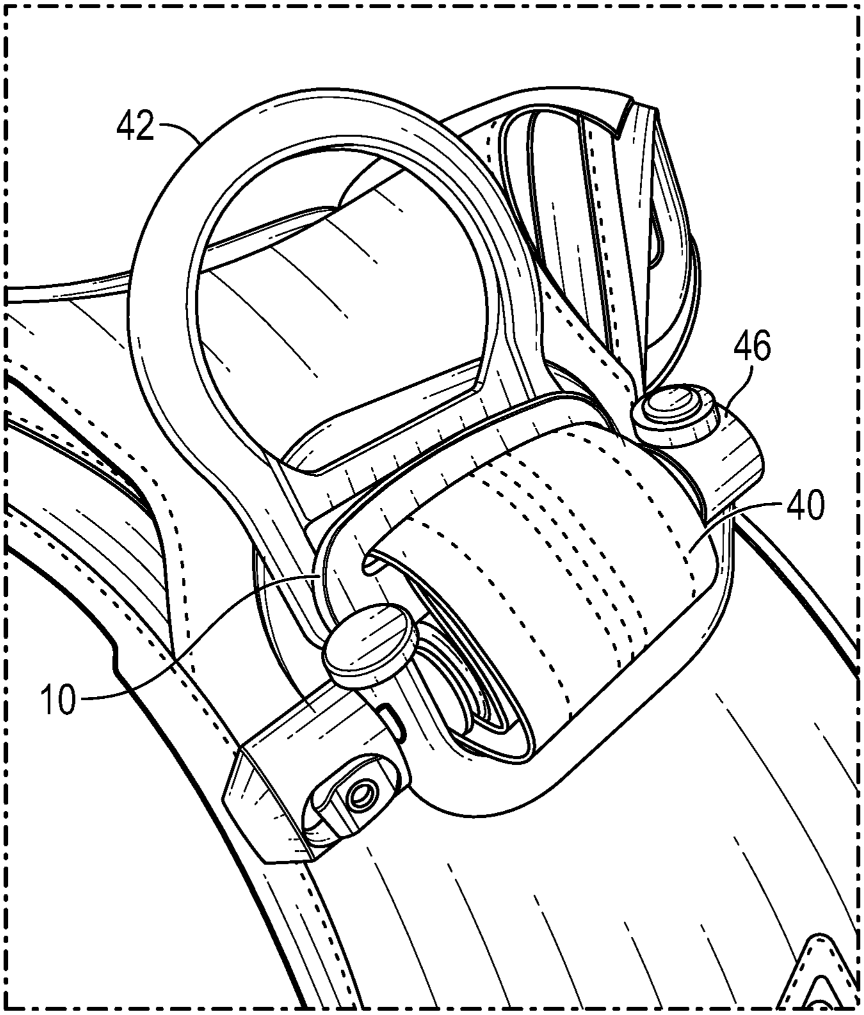
Figure 12:
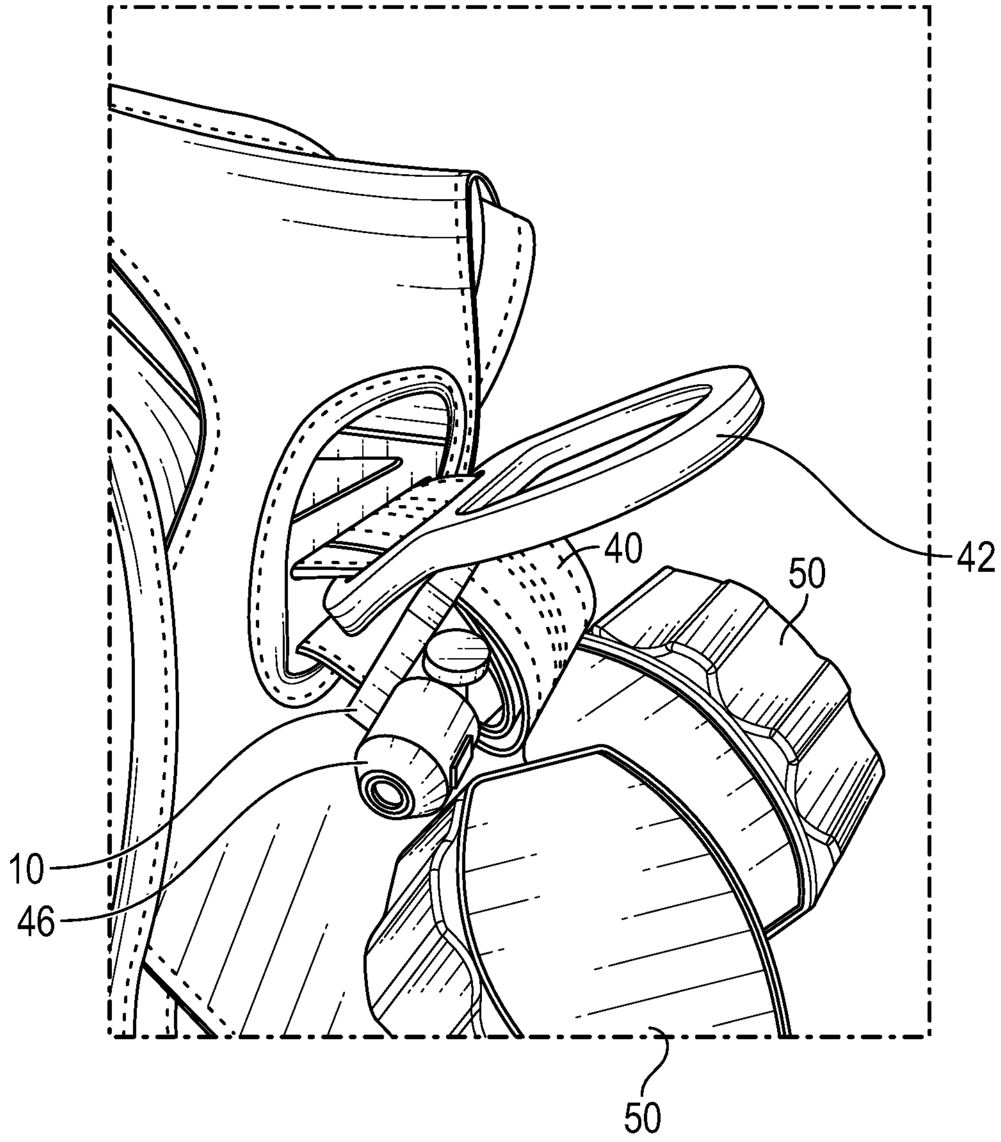

FIGS. 8-12 are views of a process of attaching the harness spacer 10 to the dorsal D-ring 42 location in accordance with an example embodiment of the disclosed concept. In FIG. 8, the arched members of the harness spacer 10 are pulled apart creating an opening through which webbing 40 is passed through. In FIG. 9, the webbing 40 has been pulled through the harness spacer 10 and the arched members are in the process of returning to their normal position. In FIG. 10, the arched members of the harness spacer 10 have fully returned to their normal position. As is shown in FIG. 10, the harness spacer 10 now creates a space between the webbing 40 the back of the harness. FIG. 11 shows the dual-SRL bracket 46 has been attached by passing through the arched members of the harness spacer 10. Finally, in FIG. 12, two SRLs 50 have been attached to the dual-SRL bracket 46.

As described herein, the harness spacer 10 is structured to be easily attached and detached from webbing of a harness. When employed in a dorsal D-ring location, the harness spacer 10 creates a space to easily attach and detach a dual-SRL bracket without adjusting the webbing of the harness. The harness spacer 10 may also be used on other locations of the harness to provide an accessory attachment point.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A harness spacer comprising:

a base having a slotted opening including a first outer slot, a second outer slot, and a central slot, wherein the first outer slot, the second outer slot, and the central slot form an H-shape, and wherein the central slot extends from and joins central portions of the first outer slot and the second outer slot;

a first arched member extending from the base and creating a first opening; and a second arched member extending from the base and creating a second opening, wherein the base is composed of a material having a hardness within a range of Shore A 70-100, wherein the first and second arched members each include a first leg extending from the base, a second leg extending from the base, and an arched portion connecting the first leg and the second leg, wherein the first opening is a first enclosed opening with bounds defined by the base and the first leg, second leg, and arched portion of the first arched member, wherein the second opening is a second enclosed opening with bounds defined by the base and the first leg, second leg, and arched portion of the second arched member, wherein the first outer slot is disposed proximate a first edge of the base and the second outer slot is disposed proximate a second edge, opposite the first edge, of the base, and wherein the first arched member extends from the base in a first area disposed between the first outer slot and the second outer slot on a first side of the central slot, and wherein the second arched member extends from the base in a second area disposed between the first outer slot and the second outer slot on a second side of the central slot.

2. The harness spacer of claim 1, wherein the base has a substantially rectangular shape.

3. The harness spacer of claim 1, wherein the first opening and the second opening share a common axis.

4. The harness spacer of claim 1, wherein the base includes a plurality of grooves formed on a side of the base opposite the first and second arched members.

5. The harness spacer of claim 4, wherein the plurality of grooves includes a first number of grooves formed between the first outer slot and the second outer slot on a first side of the central slot and a second number of grooves formed between the first outer slot and the second outer slot on a second side of the central slot.

6. The harness spacer of claim 1, wherein the base, the first arched member, and the second arched member are composed of the material having the hardness within the range of Shore A 70-100.

7. The harness spacer of claim 1, wherein the material is a thermoplastic material.

8. The harness spacer of claim 1, wherein the material has a hardness of about Shore A 91.

9. A harness comprising:
a webbing; and
a harness spacer attached to the webbing, the harness spacer including:
a base having a slotted opening including a first outer slot, a second outer slot, and a central slot, wherein the first outer slot, the second outer slot, and the central slot form an H-shape, and wherein the central slot extends from and joins central portions of the first outer slot and the second outer slot;
a first arched member extending from the base and creating a first opening; and
a second arched member extending from the base and creating a second opening,
wherein the base is composed of a material having a hardness within a range of Shore A 70-100, and
wherein the webbing passes through the first outer slot and the second outer slot,
wherein the first and second arched members each include a first leg extending from the base, a second leg extending from the base, and an arched portion connecting the first leg and the second leg,
wherein the first opening is a first enclosed opening with bounds defined by the base and the first leg, second leg, and arched portion of the first arched member,
wherein the second opening is a second enclosed opening with bounds defined by the base and the first leg, second leg, and arched portion of the second arched member, and
wherein the first opening and the second opening share a common axis that is parallel to a length of the first outer slot and the second outer slot.

10. The harness of claim 9, further comprising:
a mounting plaque, wherein the webbing passes through the mounting plaque;
a D-ring, wherein the webbing passes through a slot in the D-ring; and
a bracket, wherein the bracket passes through first and second openings of the harness spacer.

11. The harness of claim 10, wherein the bracket is a dual self-retracting lifeline bracket.

12. The harness of claim 10, wherein the first and second arched members are pressed against the mounting plaque and the base is spaced apart from the mounting plaque.

13. The harness of claim 9, further comprising:
a carabiner, wherein the carabiner passes through the first and second openings of the harness spacer.

14. The harness of claim 9, the base includes a plurality of grooves formed on a side of the base opposite the first and second arched members.

15. A method of attaching a harness spacer to a harness, the method comprising:
providing a harness spacer having a base having a slotted opening including a first outer slot, a second outer slot, and a central slot, wherein the first outer slot, the second outer slot, and the central slot form an H-shape, and wherein the central slot extends from and joins central portions of the first outer slot and the second outer slot, the harness spacer further including a first arched member extending from the base and creating a first opening, and a second arched member extending from the base and creating a second opening, wherein the base is composed of a material having a hardness within a range of Shore A 70-100, wherein the first and second arched members each include a first leg extending from the base, a second leg extending from the base, and an arched portion connecting the first leg and the second leg, wherein the first opening is a first enclosed opening with bounds defined by the base and the first leg, second leg, arched portion of the first arched member, and wherein the second opening is a second enclosed opening with bounds defined by the base and the first leg, second leg, and arched portion of the second arched member;
bending the base of the harness spacer by pressing the first and second arched members away from each other;
pushing webbing of the harness through the central slot while the base of the harness spacer is bent;
positioning the webbing such that the webbing passes through the first and second outer slots of the harness spacers;
releasing pressure on the first and second arched members of the harness spacer, and
positioning the webbing over the first arched member and second arched member.

16. The method of claim 15, further comprising:
passing a bracket through the first and second opening to attach the bracket to the harness spacer.

17. The harness of claim 14, wherein the plurality of grooves includes a first number of grooves formed between the first outer slot and the second outer slot on a first side of the central slot and a second number of grooves formed between the first outer slot and the second outer slot on a second side of the central slot.

* * * * *